United States Patent
Birsan et al.

(10) Patent No.: US 10,824,671 B2
(45) Date of Patent: Nov. 3, 2020

(54) ORGANIZING MULTIPLE VERSIONS OF CONTENT

(71) Applicant: International Business Machines Corporation, Armonk, NY (US)

(72) Inventors: Dorian Birsan, Toronto (CA); Jana H. Jenkins, Raleigh, NC (US); Chee W. Ooi, Ipoh (MY); James H. Roberts, Kitchener (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 515 days.

(21) Appl. No.: 15/094,229

(22) Filed: Apr. 8, 2016

(65) Prior Publication Data

US 2017/0293645 A1    Oct. 12, 2017

(51) Int. Cl.
*G06F 16/81*    (2019.01)
*G06F 16/93*    (2019.01)
*G06F 16/835*   (2019.01)

(52) U.S. Cl.
CPC .......... *G06F 16/81* (2019.01); *G06F 16/8373* (2019.01); *G06F 16/93* (2019.01); *G06F 16/835* (2019.01)

(58) Field of Classification Search
CPC ......... G06F 17/30911; G06F 17/30938; G06F 17/30929; G06F 16/81; G06F 16/93; G06F 16/8373; G06F 16/835
See application file for complete search history.

(56) References Cited

U.S. PATENT DOCUMENTS

| 5,806,078 A | * | 9/1998 | Hug ..................... G06F 17/2288 707/999.202 |
| 5,857,207 A | * | 1/1999 | Lo ........................... G06F 17/30 |
| 5,860,071 A | * | 1/1999 | Ball ................. G06F 17/30899 707/695 |
| 5,893,908 A | * | 4/1999 | Cullen ................. H04N 1/2166 |

(Continued)

OTHER PUBLICATIONS

Luer et al., WREN—an environment for component-based development. vol. 26. No. 5. ACM, 2001 (pp. 207-217).

(Continued)

*Primary Examiner* — Neveen Abel Jalil
*Assistant Examiner* — Hubert Cheung
(74) *Attorney, Agent, or Firm* — Cantor Colburn LLP; Samuel Waldbaum (57) ABSTRACT

Embodiments are directed to a computer implemented method of processing multiple versions of documents. The method includes importing a new version of a document. The method further includes determining that a section of the document can be imported from a previous version of the document. The method further includes creating a table of contents entry for the section and indexing the new version of the document. Another embodiment can be directed to a computer implemented method of implementing searches across multiple versions of a document. After receiving a search query, the search query can be performed across multiple versions of the document. Duplicates can be analyzed and removed. If there are no results from a target version, search results from a prior version of a document are analyzed to find a result from the target version.

4 Claims, 4 Drawing Sheets

(56) References Cited

U.S. PATENT DOCUMENTS

| | | | |
|---|---|---|---|
| 5,893,914 A | | 4/1999 | Clapp |
| 6,061,698 A * | | 5/2000 | Chadha ............... G06F 17/214 707/E17.118 |
| 6,308,179 B1 | | 10/2001 | Petersen |
| 7,181,682 B1 * | | 2/2007 | Manson ............... G06F 40/149 715/234 |
| 8,051,047 B2 * | | 11/2011 | Takahashi ......... G06F 17/30011 707/687 |
| 8,504,827 B1 * | | 8/2013 | Sizer ................. G06F 21/6227 713/167 |
| 8,631,077 B2 * | | 1/2014 | Chen .................... G06Q 10/107 379/88.22 |
| 9,002,867 B1 * | | 4/2015 | Adams ............. G06F 17/30663 707/722 |
| 9,678,959 B2 * | | 6/2017 | Urban ................. G06F 17/3002 |
| 10,579,609 B2 * | | 3/2020 | Goel ....................... G06F 16/24 |
| 2003/0200235 A1 * | | 10/2003 | Choy ................... G06F 16/219 |
| 2006/0184387 A1 * | | 8/2006 | Richardson ........... G06Q 40/08 705/2 |
| 2007/0043686 A1 * | | 2/2007 | Teng ................ G06F 17/30923 |
| 2008/0168135 A1 * | | 7/2008 | Redlich ................. G06Q 10/10 709/204 |
| 2010/0030752 A1 * | | 2/2010 | Goldentouch .......... G06F 16/81 707/797 |
| 2011/0246869 A1 * | | 10/2011 | Vion-Dury ........... G06F 40/194 715/229 |
| 2014/0181016 A1 * | | 6/2014 | Whitehead .............. G06F 11/00 707/613 |
| 2014/0215019 A1 * | | 7/2014 | Ahrens ............... G06F 16/9574 709/219 |
| 2016/0055196 A1 * | | 2/2016 | Collins ............... G06F 17/2211 707/690 |
| 2016/0224548 A1 * | | 8/2016 | Massand ................ G06F 16/93 |
| 2016/0232143 A1 * | | 8/2016 | Fickenscher ........ G06F 16/1794 |

OTHER PUBLICATIONS

Lynch, "Networked information resource discovery: an overview of current issues." Selected Areas in Communications, IEEE Journal on 13.8 (1995), (pp. 1505-1522).

Nelson, "Xanalogical structure, needed now more than ever: parallel documents, deep links to content, deep versioning, and deep re-use." ACM Computing Surveys (CSUR) 31.4es (1999): 33, (pp. 1-32).

Oosterdrop et al. (Eds.). "Creation, Use, and Deployment of Digital Information," Lawrence Erlbaum Associates, Mahwah NJ Chapter 3 "Reuse of content and digital genres." (2005), (pp. 27-54) Viewable at https://scholar.google.com/scholar?hl=en&q=%22sea.

Romanovsky et al., "Refactoring the documentation of software product lines." Software Engineering Techniques. Springer Berlin Heidelberg, 2011, (pp. 158-170).

Savage, Creating Sustainable Documentation Using Hypermedia _. Diss. State University of New York Institute of Technology, 2012, (pp. 1-34).

* cited by examiner

ORGANIZING MULTIPLE VERSIONS OF CONTENT

BACKGROUND

The present disclosure relates in general to the field of document management. More particularly, the present disclosure relates to systems and methodologies for facilitating the access of multiple versions of documents.

There is an increased desire to facilitate the access of multiple versions of electronically stored documents. In general, a reference herein to a document or to documentation includes electronic versions of the document/documentation, which may be processed, accessed and stored electronically. Multiple versions of a document can be present in many different situations. For example, the creation of a document by a team of writers might involve the storage of multiple versions of a document. Multiple versions can also be present in the field of technical documentation. In engineering, technical documentation can refer to any type of document that describes the handling, functionality, and architecture of a technical product under development or in use. Multiple version of such documentation can be present as the technical product evolves.

With each new version of the technical product, the technical documentation accompanying the technical product may or may not change. However, whether or not the actual documentation changes, there might still be a desire to maintain complete documentation of the technical product as well as maintaining the ability to search and browse through the documentation using version numbering.

SUMMARY

Embodiments are directed to a computer implemented method. The method includes: importing, using a processor system, a new version of a document; determining, using the processor system, that a section of the document can be imported from a previous version of the document; creating a table of contents entry for the section; and indexing the new version of the document.

Embodiments are further directed to a computer system. The system includes a memory and a processor system communicatively coupled to the memory. The processor is configured to perform a method that includes: importing a new version of a document; determining that a section of the document can be imported from a previous version of the document; creating a table of contents entry for the section; and indexing the new version of the document.

Embodiments are further directed to a computer program product. The computer program product comprises a computer readable storage medium having program instructions embodied therewith, wherein the computer readable storage system is not a transitory signal per se. The program instructions are readable by a processor system to cause the processor system to perform a method that includes: importing a new version of a document; determining that a section of the document can be imported from a previous version of the document; creating a table of contents entry for the section; and indexing the new version of the document.

Embodiments are directed to a computer implemented method. The method includes: receiving a search query for a target version of a document; performing the search query across multiple versions of the document to find preliminary results; removing duplicates from the preliminary search results; and if there are no results for the target version, using the preliminary search results for a prior version to find a result from the target version of the document.

Embodiments are further directed to a computer system. The system includes a memory and a processor system communicatively coupled to the memory. The processor is configured to perform a method that includes: receiving a search query for a target version of a document; performing the search query across multiple versions of the document to find preliminary results; removing duplicates from the preliminary search results; and if there are no results for the target version, using the preliminary search results for a prior version to find a result from the target version of the document.

Embodiments are further directed to a computer program product. The computer program product comprises a computer readable storage medium having program instructions embodied therewith, wherein the computer readable storage system is not a transitory signal per se. The program instructions are readable by a processor system to cause the processor system to perform a method that includes: receiving a search query for a target version of a document; performing the search query across multiple versions of the document to find preliminary results; removing duplicates from the preliminary search results; and if there are no results for the target version, using the preliminary search results for a prior version to find a result from the target version of the document.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Various embodiments of the present disclosure will now be described with reference to the related drawings. Alternate embodiments may be devised without departing from the scope of this disclosure. Various connections might be set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

Furthermore, although this disclosure includes a detailed description of various embodiments, implementation of the teachings recited herein are not limited to embodiments described herein. Rather, embodiments of the present disclosure are capable of being implemented in conjunction with any other type of system, now known or later developed.

At least the features and combinations of features described in the immediately present application, including the corresponding features and combinations of features depicted in the figures amount to significantly more than implementing a method of organizing multiple versions of content in a particular technological environment. Additionally, at least the features and combinations of features described in the immediately preceding paragraphs, including the corresponding features and combinations of features depicted in the figures go beyond what is well-understood, routine and conventional in the relevant field(s).

Many different types of products have associated documentation. While embodiments presented herein can be applicable to any such product, embodiments might be of particular interest to products that have multiple versions. As an example, the supporting documentation (both text and figures) of computerized products, both software and hardware, can be updated relatively often, leading to many different versions of documentation referring to the products being available.

While some documentation topics might change between versions, other topics remain the same across multiple versions, especially for minor version updates. Many modern search engines remove duplicate pages, which might make it more difficult for a user to search for a specific product version. In addition, while embodiments described herein discuss the creation of documentation such as user's manuals, it should be understood that embodiments described herein are applicable in any environment in which multiple versions of any type of document are created.

For example, the seven most recently released versions of the database software DB2, distributed by IBM include: DB2 for Linux and Windows 10.5.0; DB2 for Linux and Windows 10.1.0; DB2 for Linux and Windows 9.8.0; DB2 for Linux and Windows 9.7.0; DB2 for Linux and Windows 9.5.0; DB2 for Linux and Windows 9.1.0; and DB2 for Linux and Windows 8.2.0. When a particular command or instruction changes between versions of the DB2 software, the accompanying technical documentation (user's manual, quick start guides, and the like) also changes. However, if the implementation of a particular command or instruction does not change between versions, the documentation for that instruction might not change. This can lead to difficulty in fulfilling electronic search requests.

Electronic search requests are often performed using a filter or other feature that limits search results based on version. Typically, a user might only want results for a particular version. In other words, because of intervening changes between version 8.2.0 and version 10.1.0, returning a result for version 8.2.0 might be useless for a user using version 10.1.0. The same is true for newer versions, as newer versions might have new features that are not present in older versions. Thus, a user using version 8.2.0 typically is not interested in results from any version newer than 8.2.0.

There might be a situation in which a user searches for an exemplary command, such as the CREATE TABLE statement. An exemplary command might have changed in one version (such as version 10.1.0), and then proceeded to the next version unchanged (such as version 10.5.0). Under a prior art methodology, a manual entry for CREATE TABLE in version 10.5.0 might merely refer to a manual entry for CREATE TABLE in version 10.1.0. Therefore, when performing a search that is specific to version 10.5.0, the CREATE TABLE command might return no results because there is no entry specific to 10.5.0. In the alternative, the entire manual for each version might be stored separately. That is, there would be a complete manual for version 10.5.0, a complete manual for version 10.1.0, a complete manual for version 9.8.0, and so on. A disadvantage of this approach is the increased storage needs and decreased search performance that result from the fact that the entire manual is stored seven times for seven versions. Other solutions of the prior art tend to focus on removing duplicates, using canonical URLs, or minimizing the need of having duplicate content.

Figure 1:
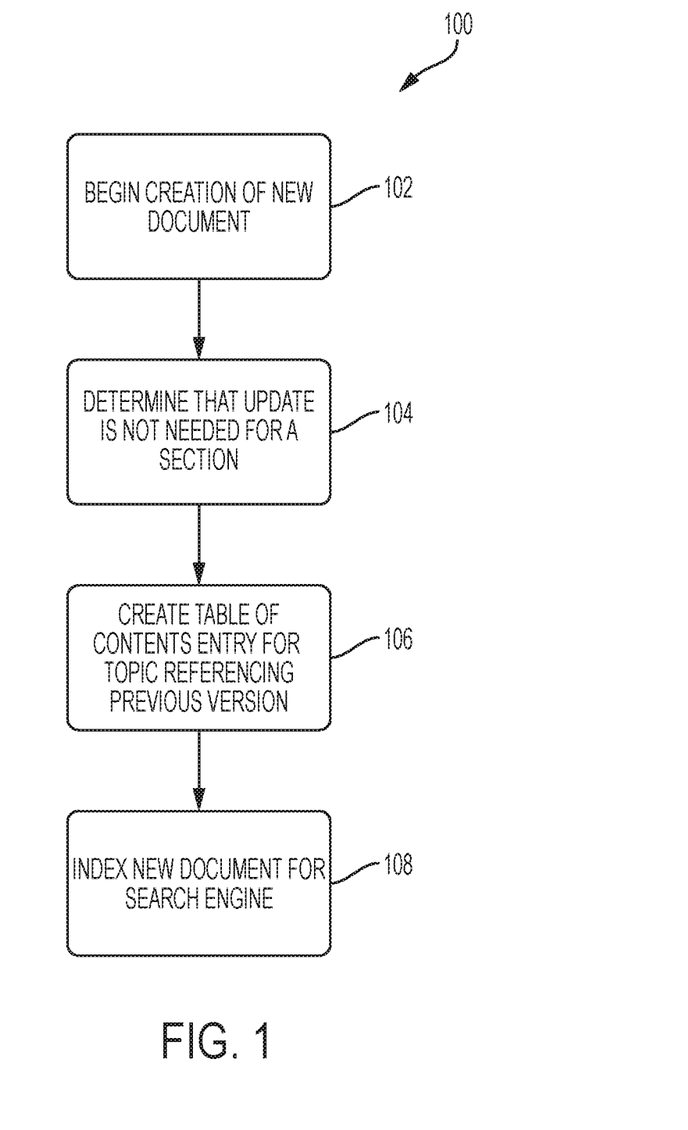
FIG. 1 depicts a flow diagram illustrating a methodology according to one or more embodiments.
Figure 3:
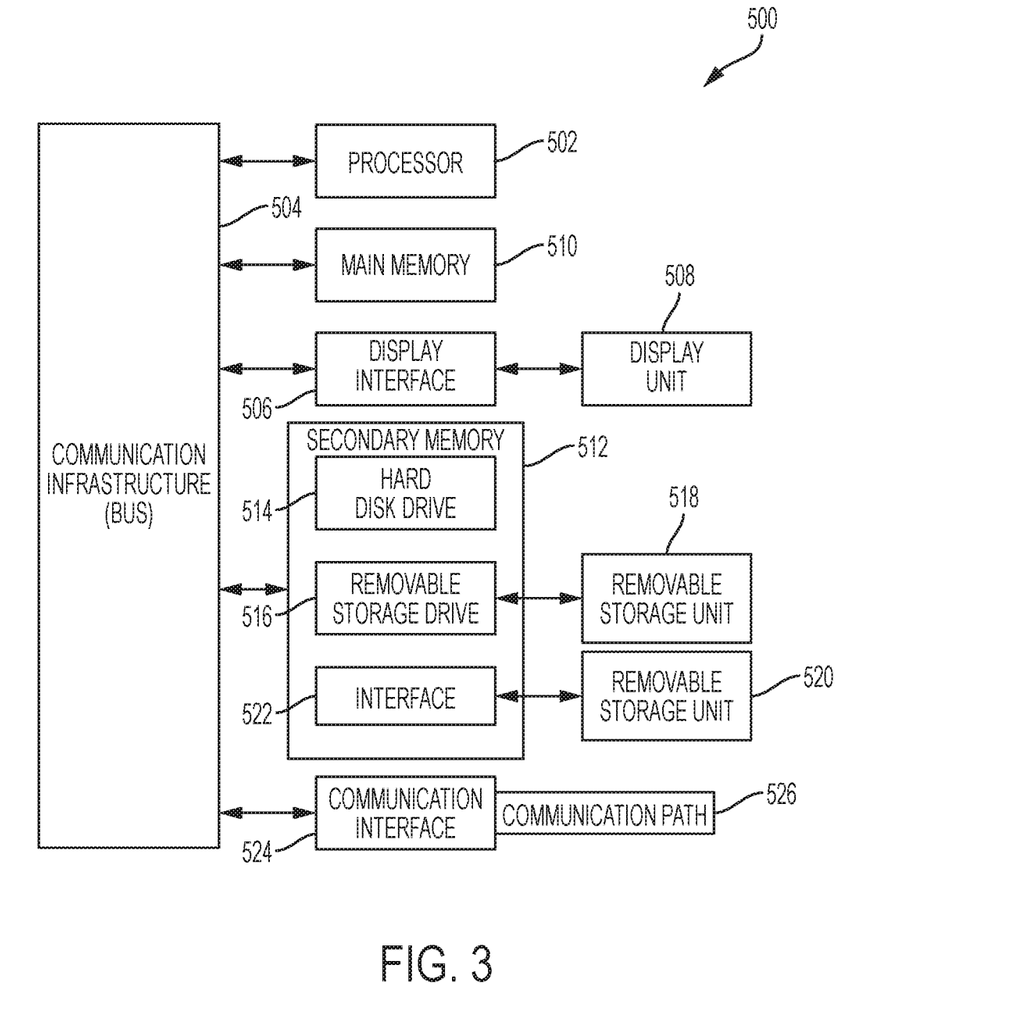
FIG. 3 depicts a computer system capable of implementing hardware components of one or more embodiments.

A flowchart illustrating a method 100 of implementing a content contribution mechanism is presented in FIG. 1. Method 100 is merely exemplary and is not limited to the embodiments presented herein. Method 100 can be employed in many different embodiments or examples not specifically depicted or described herein. In some embodiments, the procedures, processes, and/or activities of method 100 can be performed in the order presented. In other embodiments, one or more of the procedures, processes, and/or activities of method 100 can be combined or skipped. In some embodiments, portions of method 100 can be implemented by computer system 500 (FIG. 3).

A content contribution mechanism of an embodiment (such as method 100) allows topic reuse and a method for users to specify and identify a version that they are interested in. A content contribution mechanism of an embodiment (such as method 100) might rely on providing one or more tables of contents for each version of the documentation. A content contribution mechanism of an embodiment (such as method 100) might contain a naming/linking mechanism to allow topics from one collection to be re-used by reference in the table of contents of another version. In addition, duplication by copy can be supported in some embodiments. Duplication can involve a naming scheme that allows for an easy identification of duplicates by the system.

To illustrate the operation of an embodiment, reference is now made to the previously described example of using the CREATE TABLE command from DB2. The documentation at issue typically contains a table of contents, to allow easier browsing of the documentation. The table of contents might be encoded using an extensible markup language ("XML") schema. A table of contents entry for CREATE TABLE from version 10.1.0 might be formatted as follows:

```
<table_of_contents_10.1.0>
    <topic title="CREATE TABLE"
path="version10.1.0/doc/r0000927.html">
    ... <!--additional information goes here-->
</table_of_contents_10.1.0>
```

When creating documentation for version 10.5.0 under the prior art, one might duplicate the 10.1.0 entry for CREATE TABLE. The table of contents entry for CREATE TABLE would appear as follows:

```
<table_of_contents_10.5.0>
    <topic title="CREATE TABLE"
```

-continued

```
        path="version10.5.0/doc/r0000927.html">
            ...
        </table_of_contents_10.5.0>
```

In the above example, the document at version10.5.0/doc/r0000927.html is identical to the document at version10.1.0/doc/r0000927.html. Such a method results in duplication of content, which might not be desirable for at least the reasons set forth above. Method 100 avoids such a duplication through the use of re-use by reference, which results in a "virtual linking path" to another product version. In this case, the 10.1.0 version of CREATE TABLE topic would be reused in the 10.5.0 version of the CREATE TABLE topic. A document (such as a user's manual) for a new version is to be imported into a system such that the document can be accessed, searched, browsed, and the like (block 102). Typically, the document is created in an electronic format that is easily readable and searchable. In many embodiments, the document is marked up using a markup language, such as extensible markup language (XML), standard generalized markup language (SGML), hypertext markup language (HTML), and the like. The benefit of a markup language is that structure, formatting, and other information can be stored in tags. Other languages can be used.

An evaluation is made in order to determine that a particular section does not need to be updated for the new version (block 104). For example, if it is determined that the particular section can be imported from a previous version, that particular section does not need to be updated for the new version. It should be understood that a document typically contains one or more sections. Each of the one or more sections can contain a portion of the document. A table of contents entry is created for the section in question (block 106). The table of contents entry is in the following format:

```
        <table_of_contents_10.5.0>
            <topic title="CREATE TABLE"
        path="../version10.1.0/doc/r0000927.html">
            ...
        </table_of_contents_10.5.0>
```

The above table of contents entry is different. In particular, the ".." at the beginning of the path indicates a relative path pointing to the parent directory. The remainder of the path indicates that the version10.1.0 entry is being used by reference. Thereafter, when a search engine indexes the two documentation collections (block 108), the common CREATE TABLE topic (r0000927.html) is classified under both version 10.1.0 and version 10.5.0. This classification allows search queries to be filtered by the appropriate product version and still find the topic.

In some instances, duplication cannot be avoided for one of a variety of different reasons. In such a case, another disclosed embodiment, as described below, might be used to still allow the user to find the right version of the topic.

Consider again the first two table of contents shown above, where each product version has its own copy of the CREATE TABLE topic (a file called r0000927.htm).

```
        <table_of_contents_10.1.0>
            <topic title="CREATE TABLE"
        path="../version10.1.0/doc/r0000927.html">
            ...
        </table_of_contents_10.5.0>
```

And the version 10.5.0 table of contents entry is as follows:

```
        <table_of_contents_10.5.0>
            <topic title="CREATE TABLE"
        path="version10.5.0/doc/r0000927.html">
            ...
        </table_of_contents_10.5.0>
```

Because the 10.5.0 version is identical to the 10.1.0 version, it is possible that known search engine methodologies will not index the 10.5.0 version (as discussed above, many modern search engine technologies automatically remove duplicate search results). If the search engine only indexed the topic form version 10.1.0 (version10.1.0/doc/r0000927.html), the 10.5.0 version of the topic (version10.5.0/doc/r0000927.html) will not be found by a search query. Therefore, when a user is searching through the 10.5.0 version of the product documentation, the user will not find the documentation for the CREATE TABLE command. The above-described problem can be alleviated through method 200 shown in FIG. 2.

Figure 2:
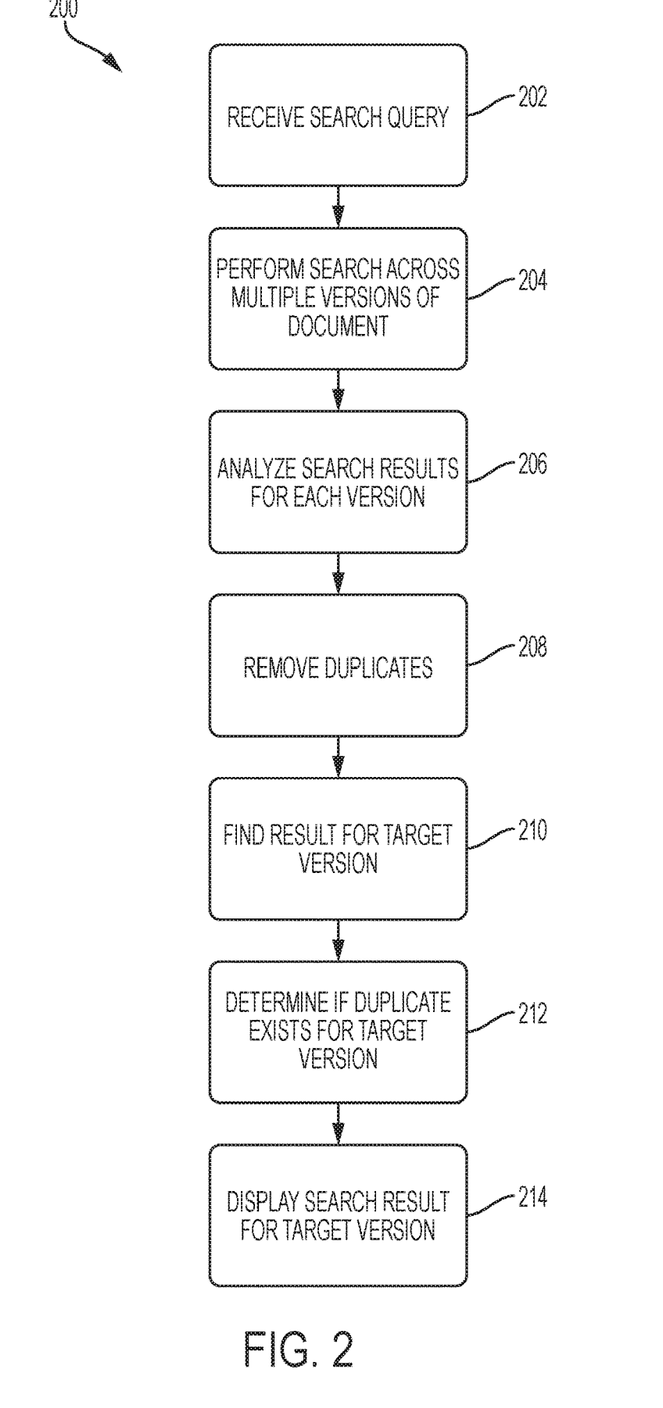
FIG. 2 depicts a flow diagram illustrating a methodology according to one or more embodiments.

A flowchart illustrating a method 200 of implementing a search algorithm according to one or more embodiments is presented in FIG. 2. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped. In some embodiments, portions of method 200 can be implemented by computer system 500 (FIG. 3).

A search query is received (block 202). The search query might be submitted by a user using one of a variety of different methods. It is assumed here that the user has requested search results from only version 10.5.0. The search query is transcoded such that the query is performed across all available versions (block 204).

The search results are analyzed to identify the version from which each result comes (block 206). The results from versions other than 10.5.0 are then compared to other results to remove duplicates (block 208).

For the remaining search results from versions other than 10.5.0, the returned topics can be compared against the topics from 10.5.0 (the "target version") (block 210). The search results might contain a reference to "version10.1.0/doc/r0000927.html". The system will look up "doc/r0000927.html" from under the version10.5.0 folder to see if a matching topic is found (block 212). If found, then that topic, "version10.5.0/doc/r0000927.html" will be returned as a search hit, which can then be displayed to a user (block 214). In other words method 200 treats the indexed duplicate content as a proxy for all the other duplicate topics with the same file name. Furthermore, method 200 returns the actual duplicate topic when it is the one that is expected to be returned.

FIG. 3 depicts a high level block diagram of a computer system 500, which may be used to implement one or more embodiments of the present disclosure. More specifically, computer system 500 may be used to implement hardware components capable of implementing method 100 shown in FIG. 1 and method 200 shown in FIG. 2. Although one exemplary computer system 500 is shown, computer system 500 includes a communication path 526, which is capable of connecting computer system 500 to additional systems (not depicted) and may include one or more wide area networks (WANs) and/or local area networks (LANs) such as the Internet, intranet(s), and/or wireless communication network(s). Computer system 500 and additional systems are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and may also include a secondary memory 512. Secondary memory 512 may include, for example, a hard disk drive 514 and/or a removable storage drive 516, representing, for example, a floppy disk drive, a magnetic tape drive, or an optical disc drive. Hard disk drive 514 may be suitably replaced by a solid-state drive (SSD) or a hybrid drive that combines an SSD with a hard disk drive. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 may include other similar means for allowing computer programs or other instructions to be loaded into the computer system. Such means may include, for example, a removable storage unit 520 and an interface 522. Examples of such means may include a program package and package interface (such as that found in video game devices), a removable memory chip (such as an EPROM, Secure Digital (SD) card or PROM) and associated socket, and other removable storage units 520 and interfaces 522 which allow software and data to be transferred from the removable storage unit 520 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, or a PCM-CIA slot and card, and the like. Software and data transferred via communications interface 524 are in the form of signals which may be, for example, electronic, electromagnetic, optical, or other signals capable of being transmitted and received by communications interface 524. These signals are provided to communications interface 524 via communication path (i.e., channel) 526. Communication path 526 carries signals and may be implemented using wire or cable, fiber optics, a phone line, a cellular phone link, an RF link, and/or other communications channels.

In the present disclosure, the terms "computer program medium," "computer usable medium," and "computer-readable medium" are used to generally refer to media such as main memory 510 and secondary memory 512, removable storage drive 516, and hard disk drive 514. Computer programs (also called computer control logic) are stored in main memory 510 and/or secondary memory 512. Computer programs may also be received via communications interface 524. Such computer programs, when run, enable the computer system to perform the features of the present disclosure as discussed herein. Accordingly, such computer programs represent controllers of the computer system.

It can be seen from the forgoing detailed description that one or more embodiments of the present disclosure provide technical benefits and advantages. Systems and methodologies of the present disclosure provide methodologies that allow for the organization and access of multiple versions of content. The content can be in the form of the written word. In particular, the content may be documentation, user's manuals, and the like regarding products that are periodically updated.

Figure 4:
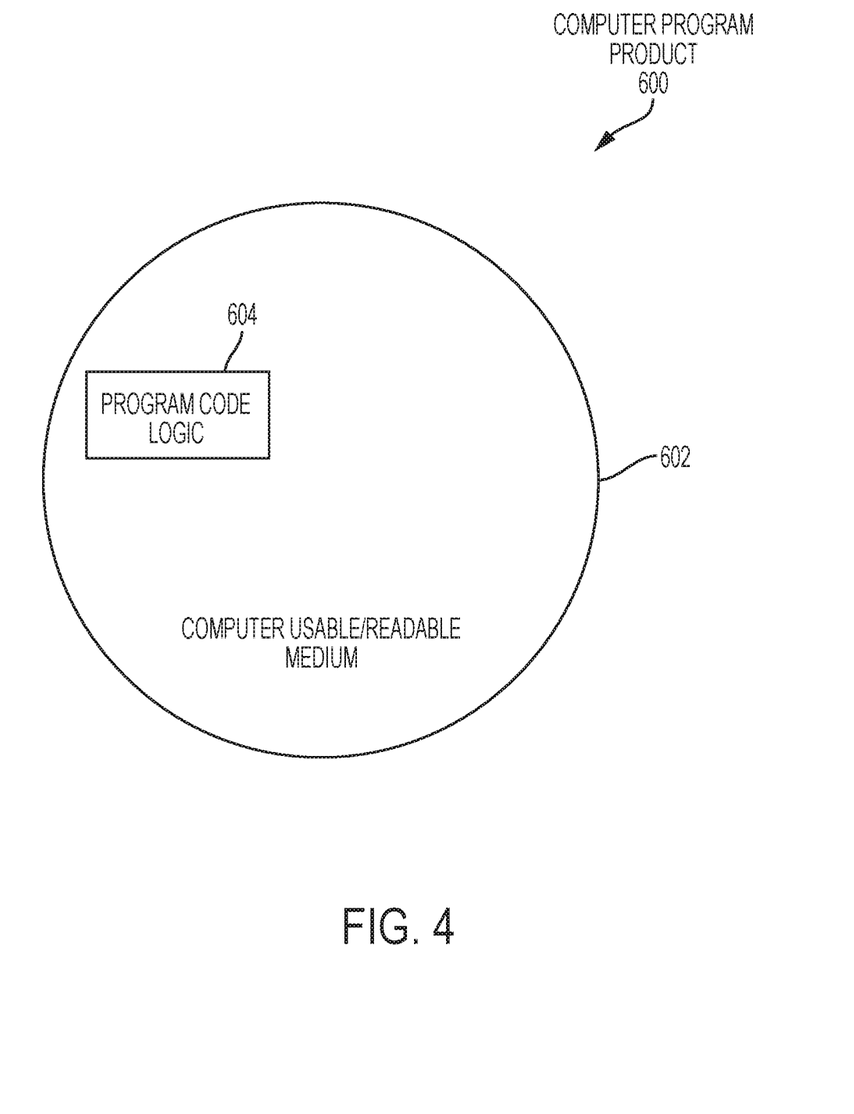
FIG. 4 depicts a diagram of a computer program product according to one or more embodiments.

Referring now to FIG. 4, a computer program product 600 in accordance with an embodiment that includes a computer-readable storage medium 602 and program instructions 604 is generally shown.

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disc (DVD), a Blu-Ray disc, a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method comprising:
    importing, using a processor system, a new version of a document;
    comparing the new version of the document to a previous version of the document;
    determining, using the processor system, that a section of the new version of the document is a duplicate of a previous section from the previous version of the document;
    creating a table of contents in the new version of the document, the table of contents comprising an entry for the section of the new version, wherein the entry comprises a title referencing a new version number for the new version of the document;
        wherein the entry is created in extensible markup language (XML); and
    indexing the new version of the document by formatting the entry, using an XML format, to label an XML title for the entry with the new version number and providing a hyperlink in the entry, the hyperlink comprising a relative path to the previous version of the document and the hyperlink having the previous version number within the hyperlink, wherein the section is classified under both the new version of the document and the previous version of the document based on the XML title with the new version number and the hyperlink having the previous version number.

2. The computer implemented method of claim 1 wherein:
the reference to the previous version is a reference to a section of the previous version.

3. A computer system comprising:
a memory; and
a processor system communicatively coupled to the memory;
the processor system configured to perform a method comprising:
  importing a new version of a document;
  compare the new version of the document to a previous version of the document;
  determining that a section of the new version of the document is a duplicate of a previous section from the previous version of the document;
  creating a table of contents in the new version of the document, the table of contents comprising an entry for the section of the new version, wherein the entry comprises a title referencing a new version number for the new version of the document;
  wherein the entry is created in extensible markup language (XML); and
  indexing the new version of the document by formatting the entry, using an XML format, to label an XML title for the entry with the new version number and providing a hyperlink in the entry, the hyperlink comprising a relative path to the previous version of the document and the hyperlink having the previous version number within the hyperlink, wherein the section is classified under both the new version of the document and the previous version of the document based on the XML, title having the new version number and the hyperlink having the previous version number.

4. The computer system of claim 3 wherein:
the reference to the previous version is a reference to a section of the previous version.

\* \* \* \* \*